(12) United States Patent
Hartmann et al.

(10) Patent No.: US 8,622,221 B2
(45) Date of Patent: Jan. 7, 2014

(54) DEVICE FOR FILTERING POLYMER MELTS

(75) Inventors: Frank Hartmann, Steinfurt (DE); Michael Andress, Altenberge (DE)

(73) Assignee: Kreyenborg GmbH, Muenster (DE)

( * ) Notice: Subject to any disclaimer, the term of this patent is extended or adjusted under 35 U.S.C. 154(b) by 657 days.

(21) Appl. No.: 12/762,454

(22) Filed: Apr. 19, 2010

(65) Prior Publication Data

US 2010/0270229 A1 Oct. 28, 2010

(30) Foreign Application Priority Data

Apr. 24, 2009 (DE) .......................... 10 2009 002 648
Jul. 9, 2009 (DE) .......................... 10 2009 032 652

(51) Int. Cl.
*B01D 33/01* (2006.01)
*B01D 33/39* (2006.01)
*B01D 33/00* (2006.01)

(52) U.S. Cl.
USPC ........... 210/350; 210/340; 210/327; 210/330; 210/338; 210/437; 210/457; 425/197; 425/199

(58) Field of Classification Search
USPC ......... 210/340, 350, 327, 330, 338, 437, 457; 425/197, 199
See application file for complete search history.

(56) References Cited

U.S. PATENT DOCUMENTS 5,578,207 A * 11/1996 Kreyenborg ............... 210/323.2

FOREIGN PATENT DOCUMENTS

DE 44 20 119 C1 6/1994

* cited by examiner

*Primary Examiner* — Nam Nguyen
*Assistant Examiner* — Madeline Gonzalez
(74) *Attorney, Agent, or Firm* — Edwards Wildman Palmer LLP; Scott D. Wofsy; Arpita G. Buesing

(57) ABSTRACT

A filtering device (100) for plastic melts exhibits at least one screen plunger (10) arranged movably between an inlet channel (5) and an outlet channel (6) of a housing (1) and containing replaceable, three-dimensional filter elements (25). The inside of the filter elements (25) is connected to at least one melt channel (11, 12) formed in the screen plunger (10). The melt channel is connected to the inlet or outlet channel (5, 6) of the housing (1) when in the production position. The screen plunger (10) exhibits at least one receiving chamber (14) that can be closed using a cover (16) on the face side. Several filter elements (25) are bundled with a central distribution element (20) to a filter cartridge (30) that can be placed in the receiving chamber (14).

15 Claims, 12 Drawing Sheets

DEVICE FOR FILTERING POLYMER MELTS

BACKGROUND OF THE INVENTION

The invention relates to a filtering device for plastic melts exhibiting at least one screen plunger arranged in a screen plunger hole movably between an inlet channel and an outlet channel of a housing and containing replaceable, three-dimensional filter elements, whereby the inside of the filter element is connected to at least one melt channel formed in the screen plunger, said melt channel being connected to the inlet or outlet channel of the housing when in the production position.

Such a filtering device is known from DE 44 20 119 C1. Although it has been successful, housing and screen carrier plungers are specially matched to each other with regard to the inlet and outlet openings of the melt channels, such that it is not possible to place the also known screen carrier plungers into the housing when they exhibit screen surfaces with an onflow perpendicular to the longitudinal axis. In particular, filtering devices with such screen carrier plungers exhibiting screen surfaces with an onflow perpendicular to the longitudinal axis cannot be converted to operate using a screen carrier plunger with cartridge filters as known from the aforementioned patent document.

In addition, it has been observed that maintenance and cleaning of the known filtering device is very time-intensive.

SUMMARY OF THE INVENTION

It is, therefore, the objective of the invention to improve a filtering device of the aforementioned kind such that easy maintenance and cleaning is possible, while still providing a large filtration surface.

This objective is achieved by a filtering device, in which the screen plunger has at least one receiving chamber that can be closed by a cover on the face side, and in which a plurality of filter elements are bundled together with a central distribution element to a filter cartridge that can be placed in the receiving chamber.

In short, the distinctive feature of the design according to the invention is to form a solid screen carrier plunger in part as a tube and to populate the receiving chamber created therein with a filter cartridge.

The filter cartridge is formed from numerous candle filters, which are essentially known. These are positioned at the joint central distribution element, are fed from there, and discharge the melt across it.

The preferred flow through the filter elements is from the outside to the inside. This avoids expanding of the filter elements due to a high differential pressure between the inner and outer side. However, with a proper design of the filter elements or with a reduction of the forces acting upon them, a reverse direction of the flow is possible as well.

By using numerous filter elements, in particular candle filters or stacked filter discs, a significantly increased filtering surface is available compared to a screen carrier plunger with flat surface screens.

An additional advantage is that a perpendicular flow through the screen carrier plunger is possible. Thus, the filter plungers, which in most existing filtering devices are located in the openings for the melt feed and discharge diametrically opposite the borehole, can be connected to a screen carrier plunger designed according to the invention, with the flow passing through them. Therefore, even already existing filtering devices can be provided with the screen carrier plungers designed according to the invention without the need to modify the housing and the screen plunger boreholes.

Preferably, filter elements are positioned on both face sides of the central distribution element. This creates a dual pack of filter elements with a disc-shaped central distribution element in the center. The central distribution element being located in the center doubles the usable filter surfaces once more. At the same time, the receiving chamber in the screen carrier plunger is divided into two screen chambers that can be ventilated separate from each other after cleaning.

In one preferred embodiment, the melt is guided via a first melt channel located on the inside of the central distribution element into a receiving chamber and from there flows from the outside through the outer jacket of the candle filter. The melt that flows from the inside of the respective filter element via several outlet openings is collected in a second melt channel in the central distribution element and from there discharges from the screen plunger.

Without any design changes, the flow through the filtering device can also occur in the other direction. In such a case, the melt is distributed via the second melt channel to numerous outlet openings, which are followed by the inner sides of the candle filters or the other three-dimensional filter elements, respectively. The melt then exits through the outer cover of the filter elements and enters into the receiving chamber of the screen carrier plunger. From there, the melt flows via an additional outlet opening into the second melt channel in the central distribution element and from there to the outlet opening of the screen carrier plunger.

According to a first embodiment of the invention, the filter elements are formed by candle filters, which extend parallel to the longitudinal axis of the screen plunger, and with their open side are attached to openings on the face side of the central distribution element.

With a second and third embodiment of the invention, a second melt channel extends in the central distribution element to at least one distribution tube that protrudes into the receiving chamber and exhibits several outlet openings, and where each said distribution tube is followed by at least one filter element. Initially, the distribution tube enables the flow of the melt also in the depth of the receiving chamber, facing away from the central distribution element, whereby a uniform distribution to the filter elements that are strung along the distribution tube occurs. Short, radially oriented candle filters or disc-shaped, hollow filters are used as filter elements and surround the distribution tube at least in the area of its, in particular radial outlet openings.

In the rear area, the screen carrier plunger exhibits an outer, smooth cover area to enable closing of the channels that conduct the melt. This serves the purpose of taking one respective screen carrier plunger out of operation for maintenance, while the other screen carrier plunger continues with the filtration of the melt. The rear section can be formed by a solid material or a tube.

Preferably, the central distribution element is located approximately in the center of the receiving chamber and divides said chamber into two chambers that are sealed from each other. This allows for the simultaneous use of two filter cartridges, thus doubling the filter surface.

A rod or a tube that leads from the central distribution element to the cover facilitates the removal of the filter cartridge from the receiving chamber. In addition, pressure is applied from the cover to the central distribution element via the rod or the tube pressing said central distribution element with its edge onto the seal seat.

If a rear chamber is present, a tube can be provided there as well allowing free discharge of the melt at the end.

For a full understanding of the present invention, reference should now be made to the following detailed description of the invention as illustrated in the accompanying drawings.

DESCRIPTION OF THE PREFERRED EMBODIMENTS

Figure 1:
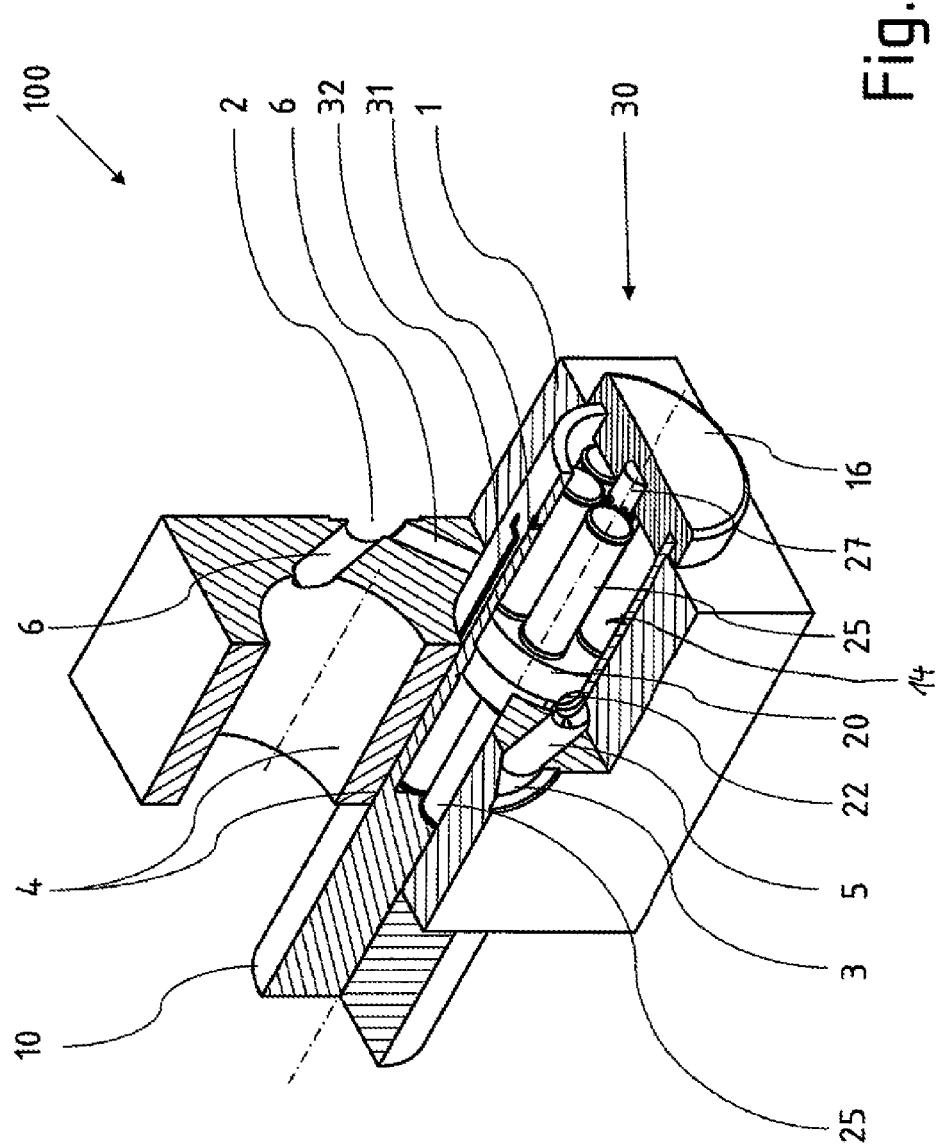
FIG. 1 is a perspective view of a first embodiment of a filtering device according to the present invention.

The preferred embodiments of the present invention will now be described with reference to FIGS. 1-10c of the drawings. Identical elements in the various figures are designated with the same reference numerals.

FIG. 1 shows a filtering device 100 that features a housing 1 with two screen carrier plunger boreholes 4. The screen carrier plunger boreholes 4 are connected to inlet and outlet openings 3, 2 via channels 5, 6.

In its inner receiving chamber 14, the screen carrier plunger 10 includes a filter cartridge 30. Towards the outside, the receiving chamber 14 is closed through a cover 16 located at the face side. In the rear area, the screen carrier plunger 10 exhibits an outer, smooth jacket area to enable closing of the channels 5, 6 that conduct the melt.

It is sufficient to remove the cover 16 from the screen carrier plunger 10 in order to pull the inserted filter cartridge 30 forward and out. The inner, empty receiving chamber 14 of the screen carrier plunger is then accessible for cleaning from the front side of the housing 1. While a conventional screen carrier plunger with perpendicular flow through the plane screen plates needs to be pulled out significantly for maintenance in order to make the screen location accessible, the screen carrier plunger designed according to the invention only needs to be pulled forward a few centimeters and rotated. This movement is necessary only to affect the closing of the channels 5, 6. However, it is not necessary to pull the screen carrier plunger 10 out further for maintenance purposes. This also saves space on the side next to the filtering device 100, a space that needed to remain free with known filtering devices for pulling the screen carrier plungers out sufficiently for cleaning.

Figure 2:
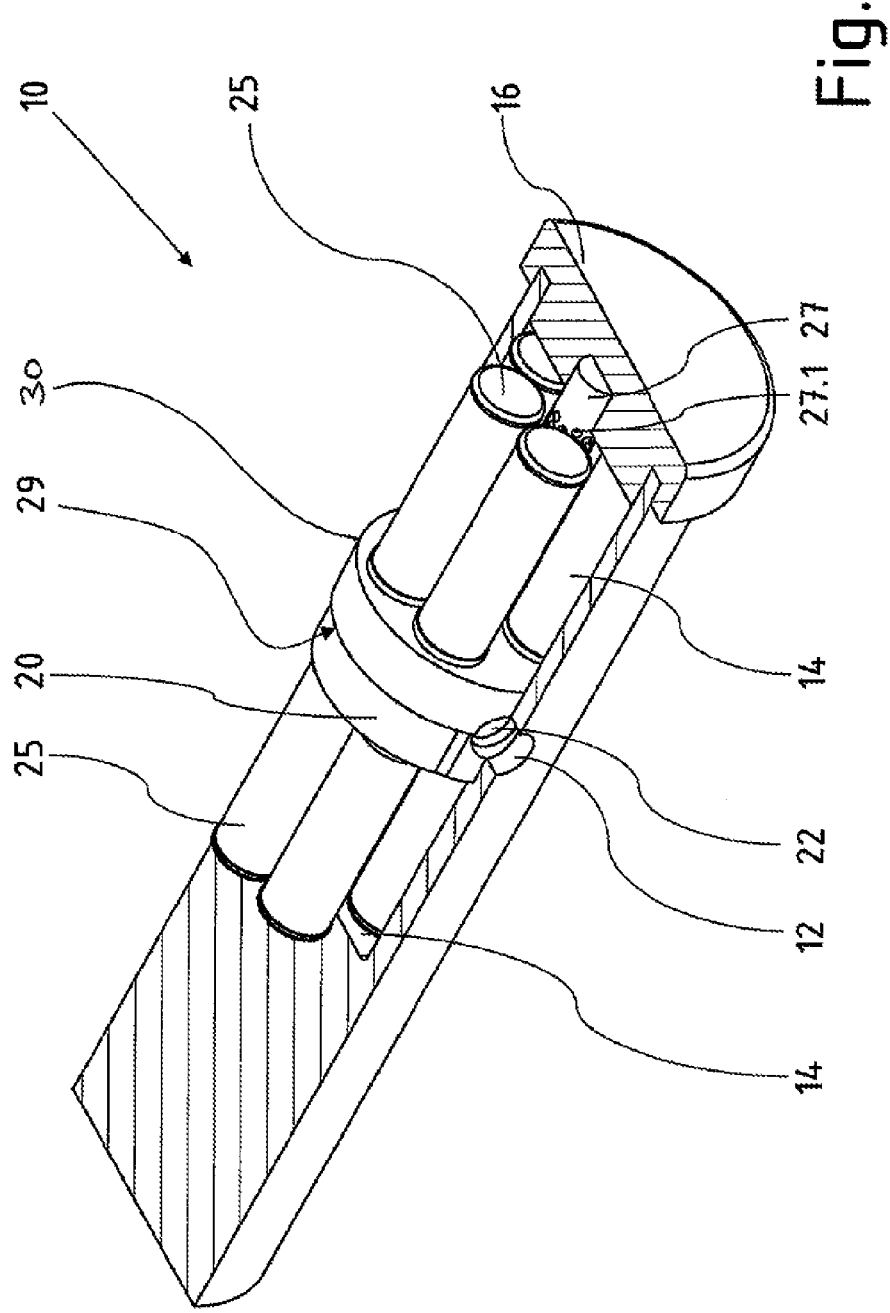
FIG. 2 is a perspective view of a screen carrier plunger according to the first embodiment.

FIG. 2 shows a semi-section of the screen carrier plunger 10 removed from the housing 1 such that the filter cartridge 30 contained in the receiving chamber 14 is visible.

The replaceable filter cartridge 30 essentially consists of a central distribution element 20 and filter elements 25 placed therein.

In FIG. 2 on the left, the inflow opening 12 can be recognized in the central distribution element 20, which is connected to an outlet opening 23 via a first melt channel 22 such that a direct path is established for the flow of the melt through the central distribution element 20 and into the receiving chamber 14.

Figure 3:
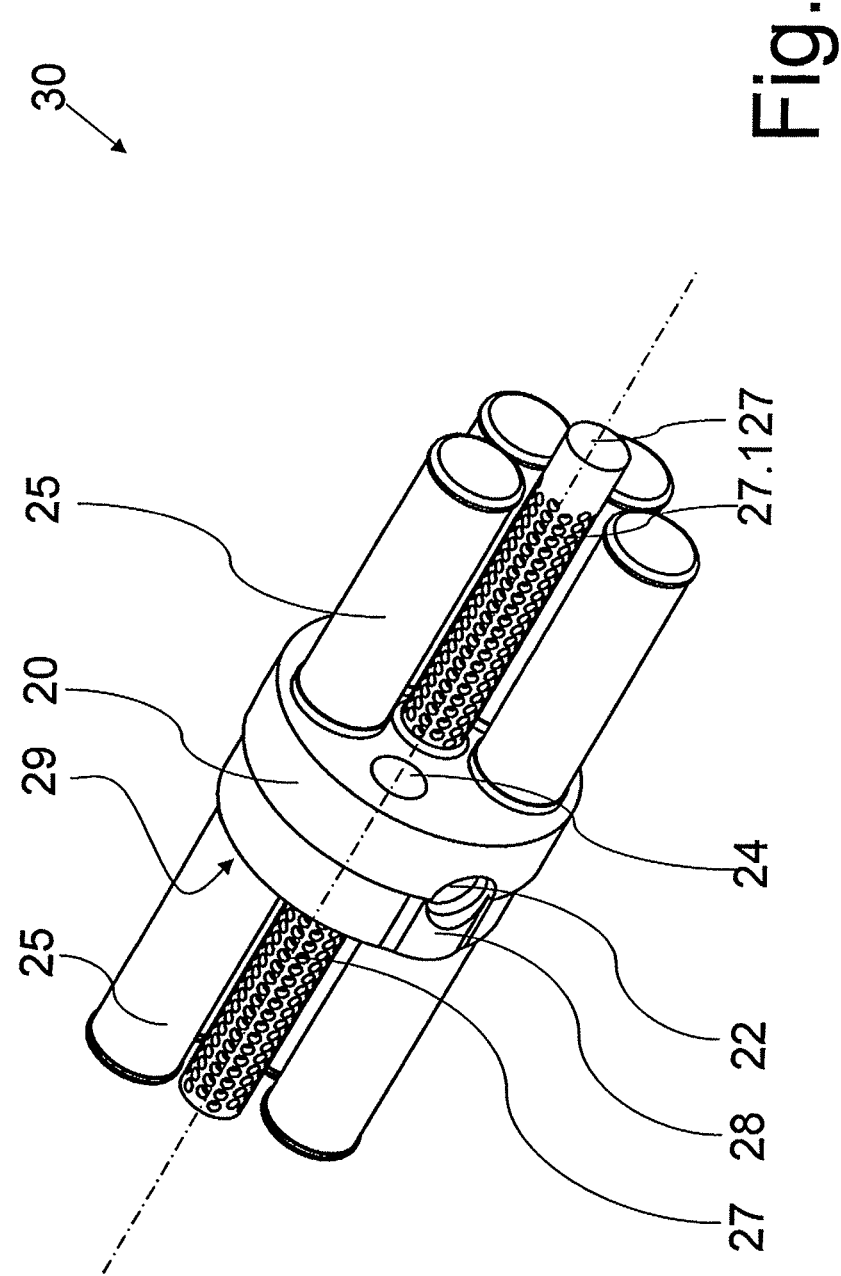
FIG. 3 is a perspective view of a filter cartridge for the screen carrier plunger.

FIG. 3 shows the filter cartridge 30 removed from the screen carrier plunger 10, said filter cartridge consisting in this shown first embodiment of the central, disc-shaped central distribution element 20 and several candle filters 25 screwed into them on the face side. In this embodiment, the candle filters 25 extend on both sides of the central distribution element 20. Thus, the central distribution element 20 also separates the receiving chamber 14 in the screen carrier plunger 10 into two separate chambers.

A lay-on edge 29 of the central distribution element rests on a respective shoulder at the inner jacket of the receiving chamber 14 and in this manner enables the tight separation of the receiving chamber into one chamber located before and another one located after the central distribution element 20. In addition, it defines the axial position of the filter cartridge 30.

Sealing between the chambers is required to avoid a transfer of melt into the outlet opening 11 (cf. FIG. 4) in the jacket of the screen carrier plunger 10. Otherwise, the filtered and non-filtered material could mix at this location.

A protrusion 28 engages in a compatible recess inside the receiving chamber 14 such that the filter cartridge 30 is secured and prevented from rotating, and that it is ensured that the openings 11, 12 (cf. FIG. 4) are located in the screen carrier plunger 10 in line with mouths of the melt channels in the central distribution element 20.

Distribution tubes 27 that extend from the central distribution element 20 into the receiving chamber affect a uniform melt flow in the depth of the receiving chamber. Radial outlet openings 27.1 are provided for this purpose.

The distribution tube 27 pointing in the direction of the cover 16 facilitates removing of the filter cartridge 30 from the receiving chamber 14. In addition, pressure is applied from the cover 16 to the central distribution element 20 via the rod 27, and said central distribution element 20 is pressed onto the seal seat with its edge 29.

After unscrewing the cover 16, the front part of the distribution tube 27 is directly accessible. To avoid canting, the distribution tube 27 is arranged centrally within the candle filters 25, which are grouped around said tube in a reference circle. In the shown embodiment, the outlet opening 23 is arranged in the center of the central distribution element 20 followed by the distribution tube 27.

In FIG. 3, one of the locations designated as outlet opening 24 is left free for a candle filter 25.

Figure 4:
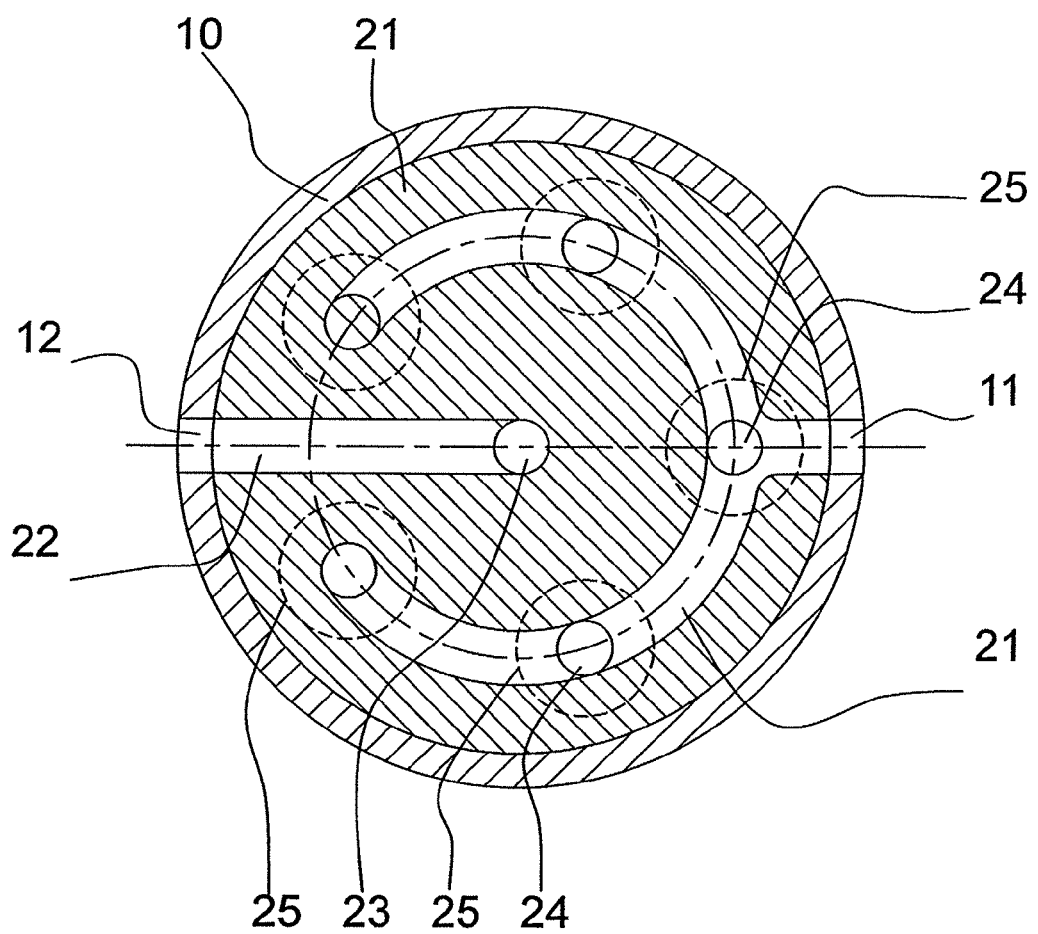
FIG. 4 is a sectional view of the screen carrier plunger.

FIG. 4 shows a section through the screen carrier plunger 10 and the central distribution element 20. Melt that is fed through the channel 3 in the housing 1 enters a first melt channel 22 through a first outlet opening 12 in the screen carrier plunger 10 and from there into the receiving opening 14 via the openings 23. The melt enters through the porous filter material of the candle filters 25, which, for example, consists of a metal mesh, into the candle filters 25, which are located upstream of the outlet openings 24 in the central distribution element 20. From the outlet opening 24, the melt flows into the second melt channel 21—exhibiting a clasp shape in a cross-sectional view—that acts as a collector and re-combines the partial melt streams from the various openings 24. From there, discharge occurs via a second outlet opening 11 out of the screen carrier plunger 10 into the channel 6 in the housing 1 and finally at the discharge opening 2 into a subsequent process.

FIGS. 5 to 7 and 8 to 9, respectively, show additional embodiments of a filtering device 100' or 100'', respectively, which differ from the filtering device 100 described above only by the design of the inner filter cartridge.

Figure 5:
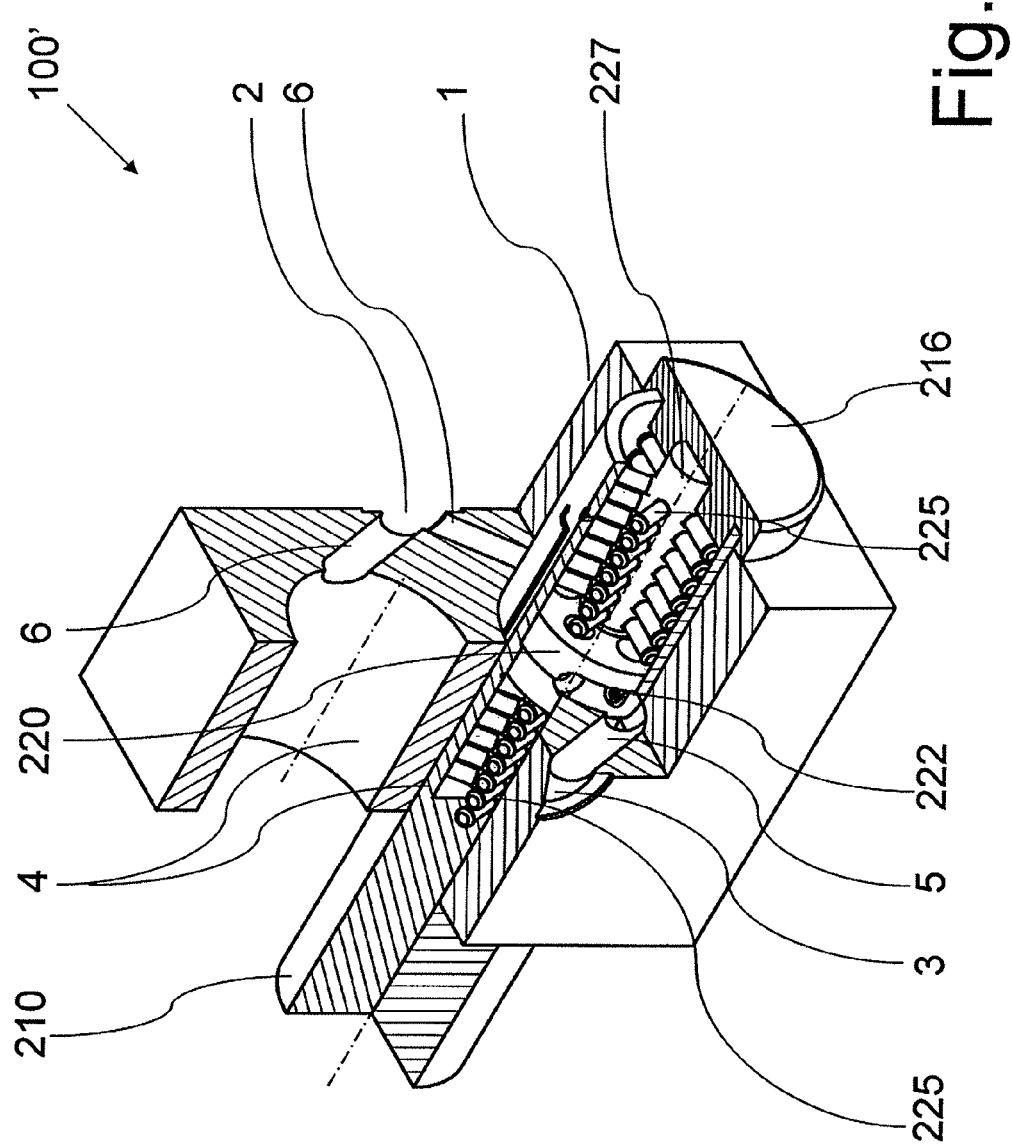
FIG. 5 is a perspective view of a second embodiment of a filtering device.
Figure 6:
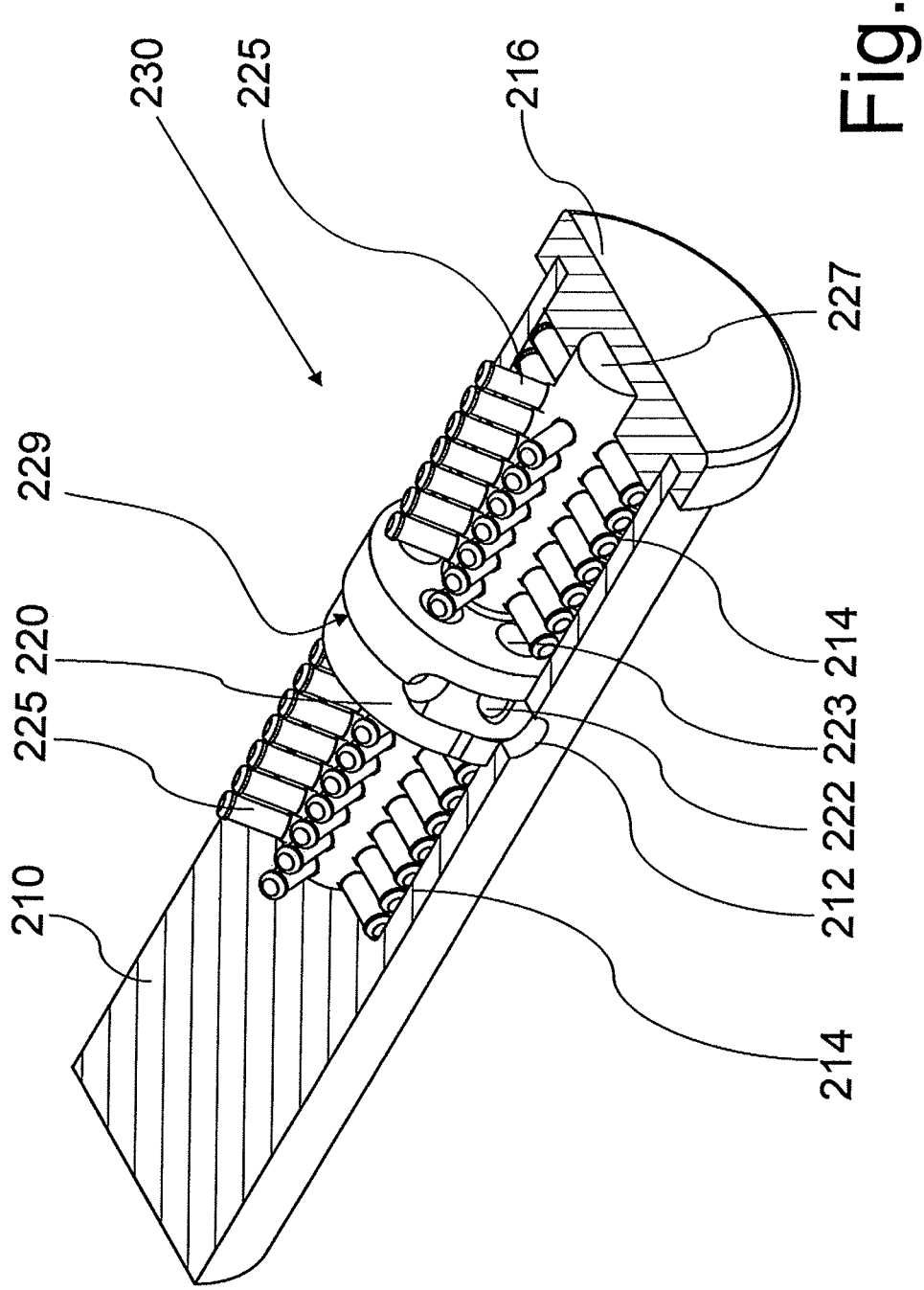
FIG. 6 is a perspective view of a screen carrier plunger according to the second embodiment of the present invention.
Figure 7:
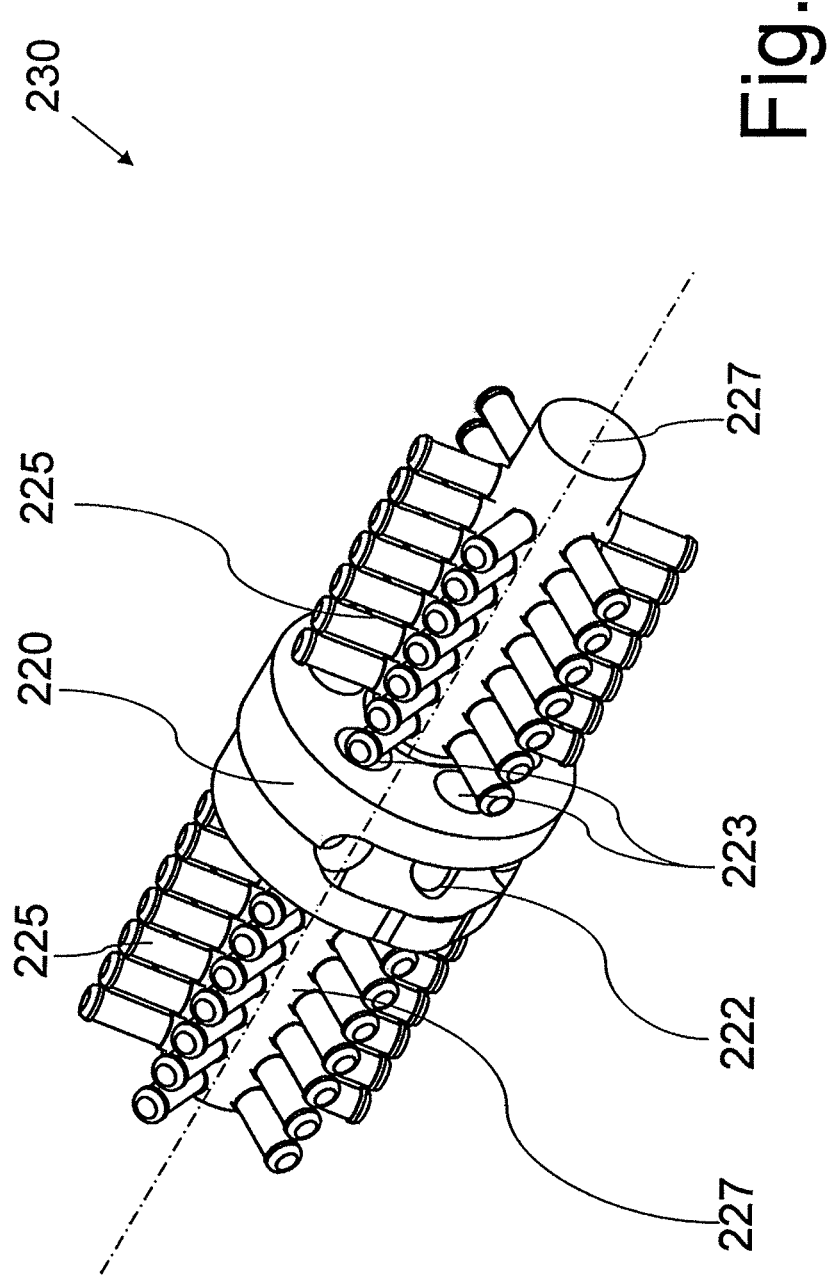
FIG. 7 is a perspective view of a filter cartridge for the screen carrier plunger according to the second embodiment.

FIGS. 5, 6 and 7 show a screen carrier plunger 210 with a filter cartridge 230, which consists of a disc-shaped central distribution element 220 with a distribution tube 227 in the center and candle filters 225 placed radially onto said distribution tube.

A flow path is formed in the central distribution element 220 between an inlet opening 212 and a melt channel 222 and ends at an outlet opening 223. There, the melt enters through the chamber, which is separated from the receiving chamber 214 through the central distribution element 220, and from there flows through the filter material of the candle filters 225 via the tube 227 back into the central distribution element 220, from where it is discharged through an internal melt channel.

The candle filters 225—with a comparable screen plunger diameter—are significantly smaller than the candle filters 25 of the first exemplary embodiment of a filter cartridge 30 according to FIGS. 1 to 4, which extend in the longitudinal direction from the central distribution element 20.

In the second embodiment, the candle filters 225 are placed radially onto the central distribution tube 227, acting as a melt collector or melt distributor depending on the direction of flow; said central distribution tube 227 also facilitates the removal of the filter cartridge 230 from the screen carrier plunger 10 after removal of the cover 227.

FIG. 6 shows the screen carrier plunger 210 with the inserted filter cartridge 230. A large filtering surface is provided by arranging numerous radially extending candle filters 225, even more so in several rows distributed around the circumference of the tube 227. It is doubled by the fact that such an arrangement of candle filters 225 extends on both sides of the central distribution element 220.

As can be seen in FIG. 7, the melt channel 222 extends in the form of an arch across a portion of the circumference of the central distribution element 220 and then transitions into several internal melt channels, each of them emptying into an outlet opening 23.

Figure 8:
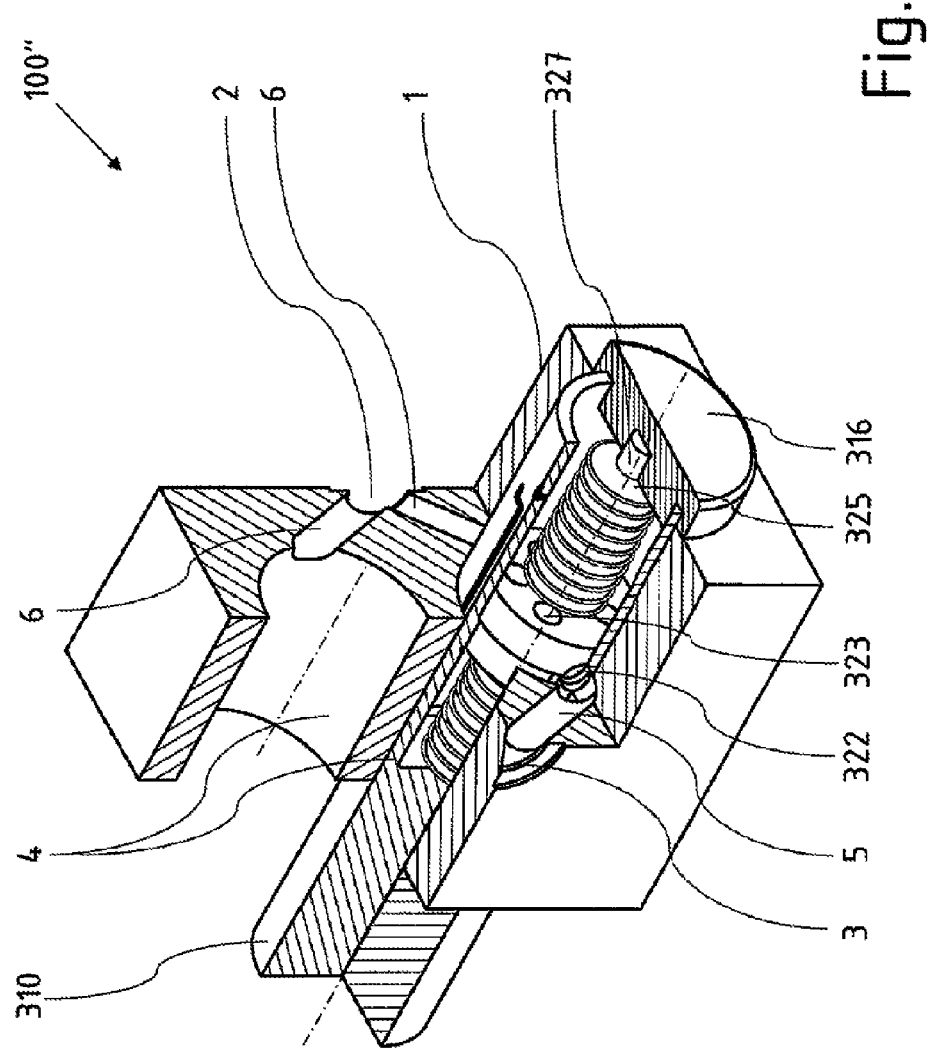
FIG. 8 is a perspective view of a third embodiment of a filtering device.
Figure 9:
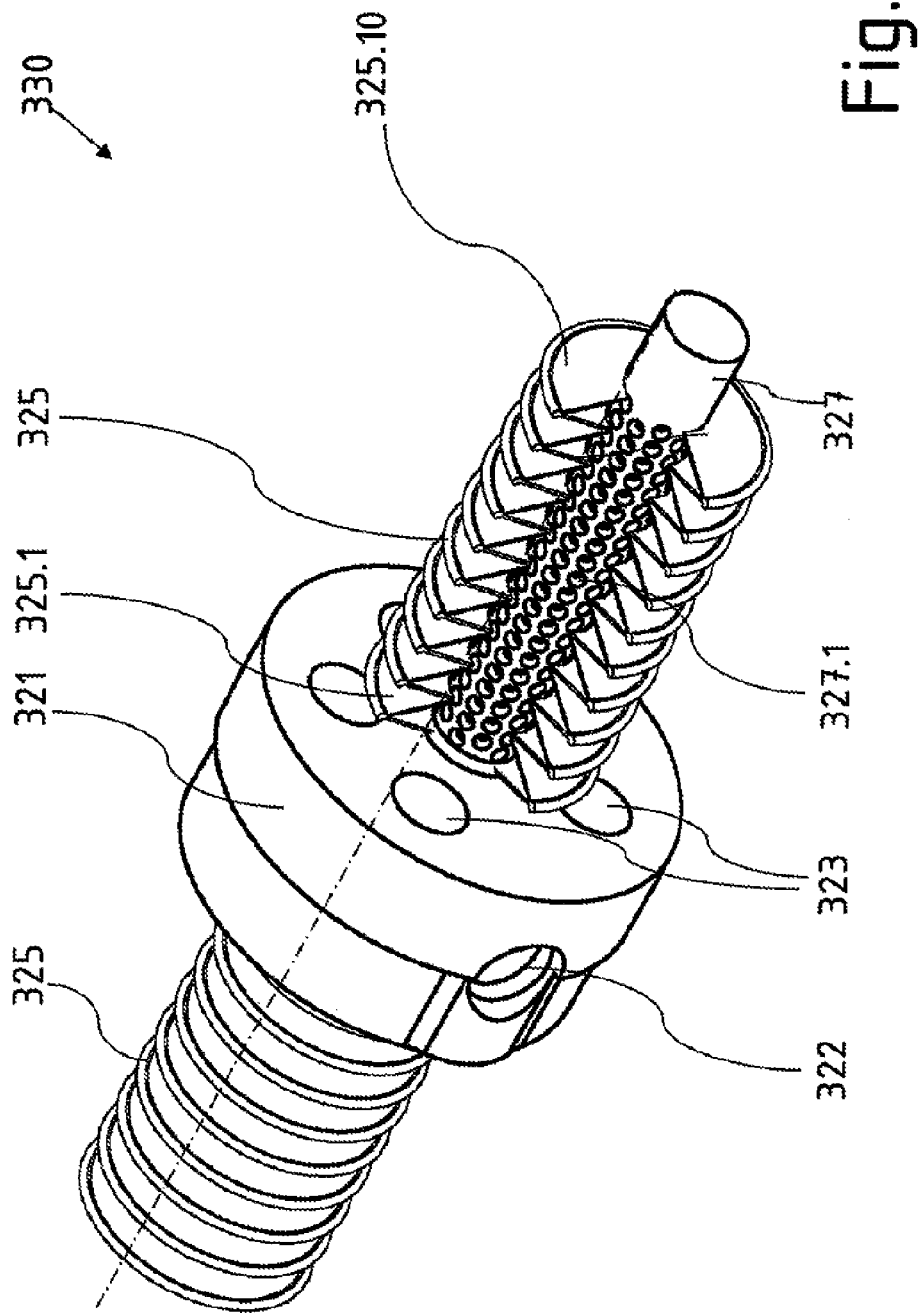
FIG. 9 is a perspective view of a filter cartridge for the screen carrier plunger according to the third embodiment.

FIGS. 8 and 9 show a third embodiment of a filtering device 100''. The housing 1 with the screen carrier plunger boreholes 4 is again not altered from the embodiments described above.

Different is a screen carrier plunger 310 or a filter cartridge 330 contained therein, a perspective view of which is pictured in FIG. 9.

At a central distribution element 320, the melt entering at an inlet opening 322 is split into several partial streams, which empty into the receiving chamber 314 at an outlet opening 323. A uniform flow from all sides is achieved by arranging several outlet openings 323 around a central tube 327 with a filter element 325. The tube 327 extends to a cover 316.

The filter element 325 consists of several ring-shaped filter discs 325.1, 325.2 . . . . At least the filter discs 325.1, . . . , 325.10 on the ends connect tightly to the tube 327 with an inner edge such that melt that flows through the receiving chamber 314 is forced to pass through the filter material before being discharged into the central distribution element 320 through the openings 327.1 in the tube 327.

Figure 10A:
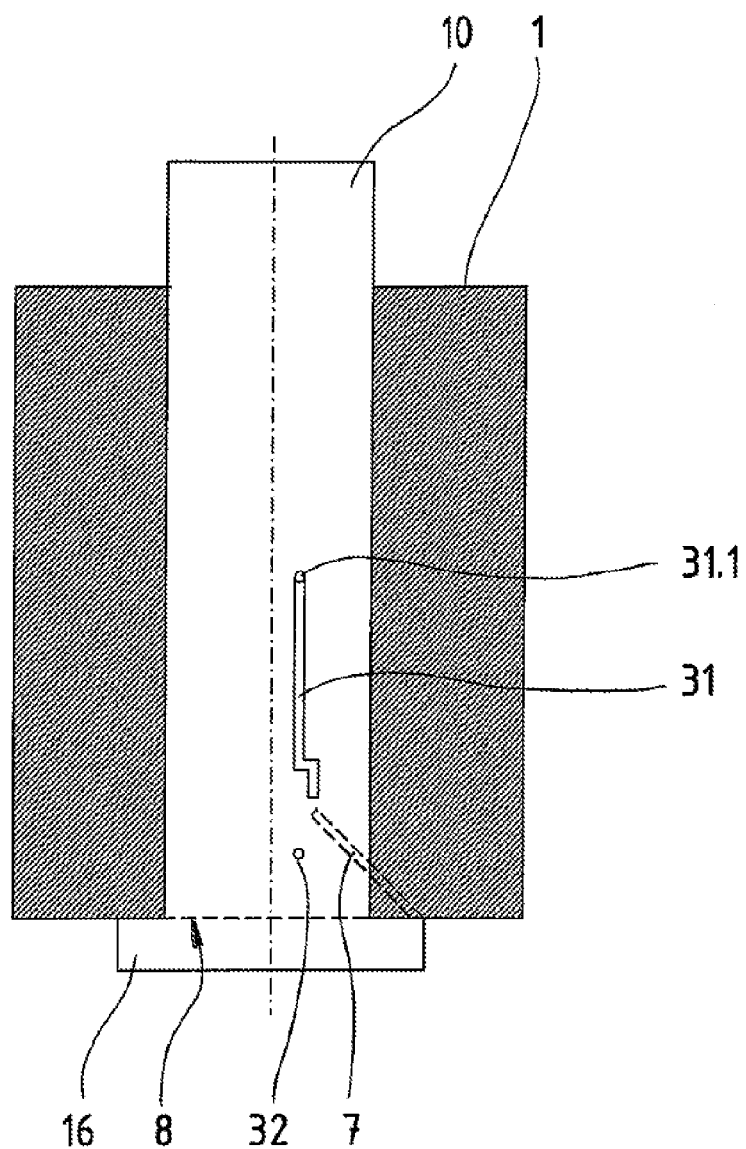
FIG. 10a to FIG. 10c are partial sectional top view of a filtering device in the venting and operating positions.
Figure 10B:
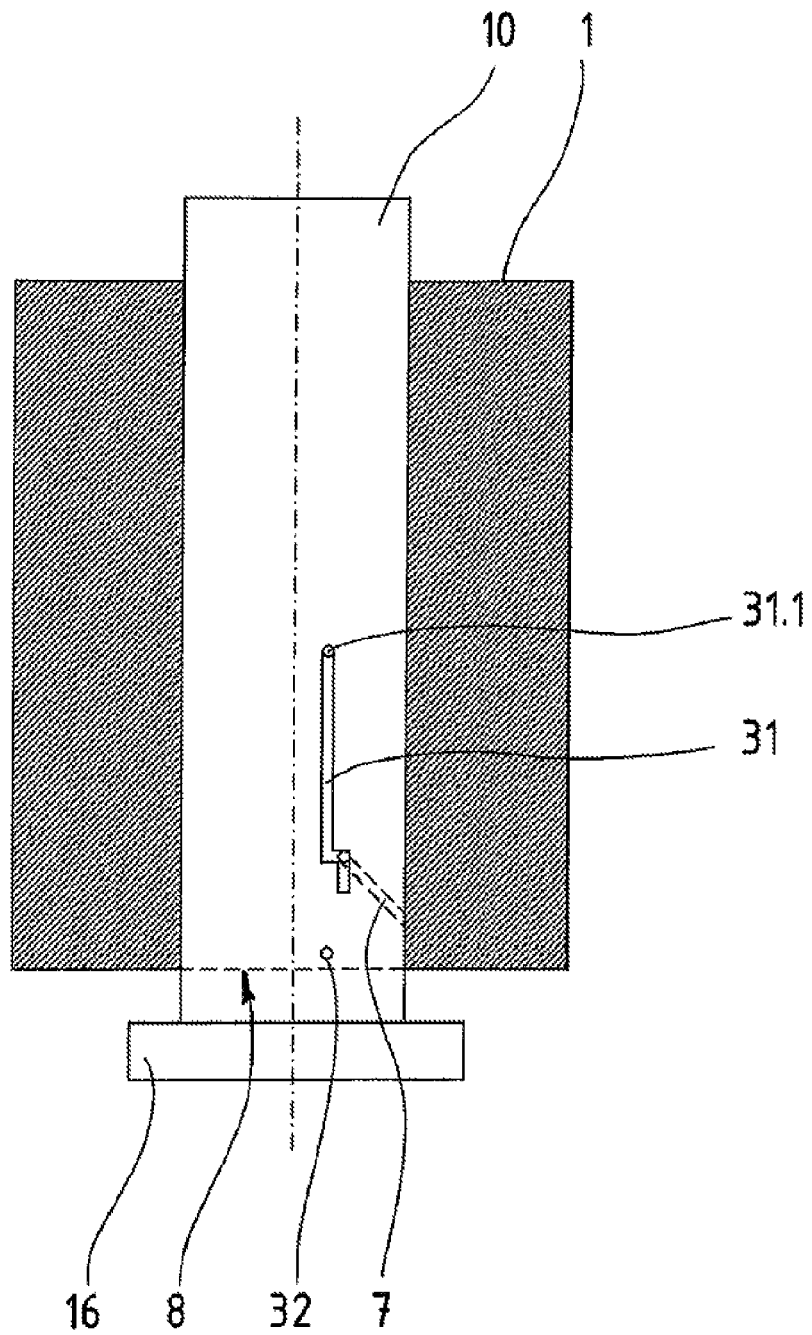
Figure 10C:
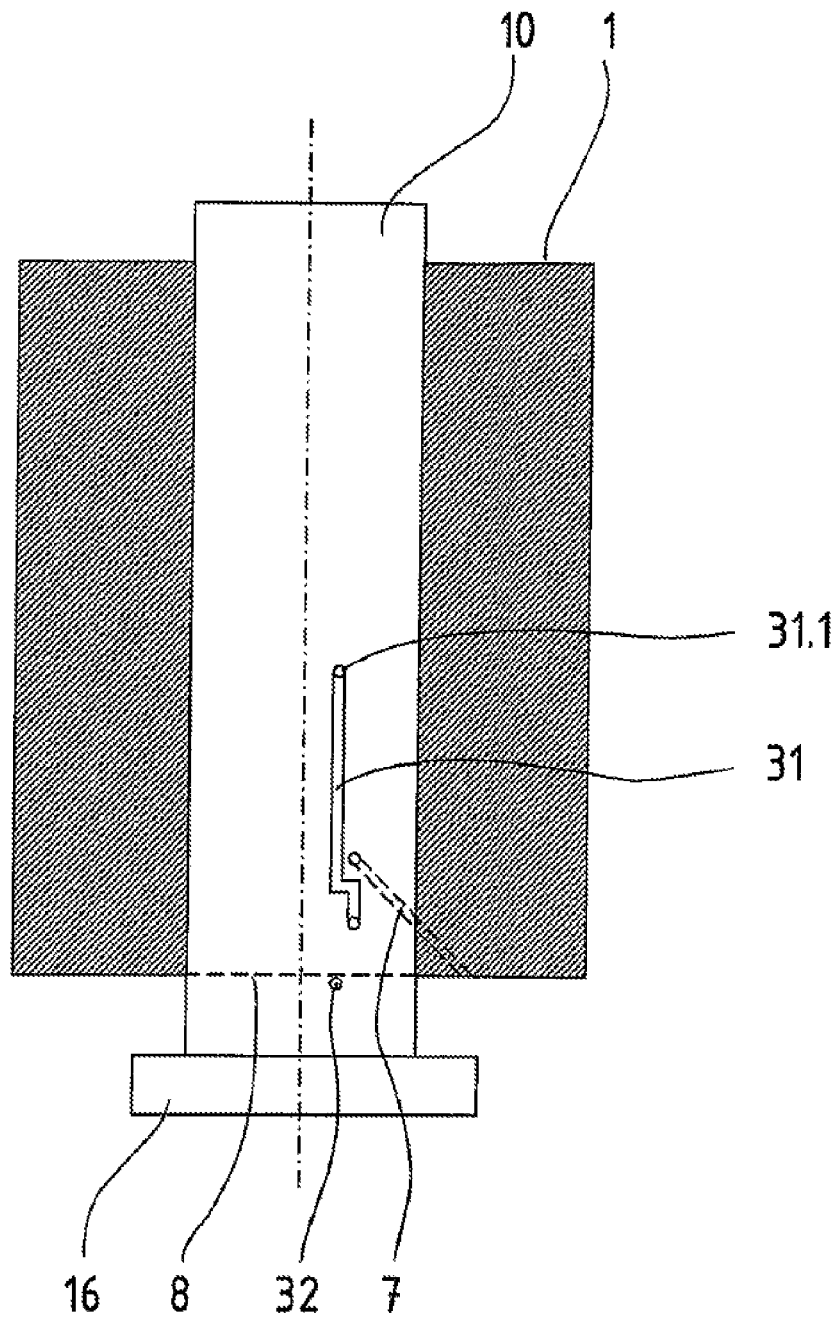

FIGS. 10a to 10c are used to describe venting and pre-flooding of the chambers in the screen carrier plunger 10 after the end of cleaning.

FIG. 10a shows the operational position. The screen carrier plunger 10 is fully inside the housing. The cover 16 may be resting on the front of the housing, for example, in order to achieve a defined position.

Placed in the front area of the screen carrier plunger 10, i.e., facing the cover 16, is a venting hole 32 that is connected to the front chamber of the receiving chamber 14. In order to vent and pre-flood the front portion of the receiving chamber 14 in the screen carrier plunger 10, it is moved into a first venting position according to FIG. 10c, i.e., sufficiently moved out of the housing such that the venting hole 32 is positioned free in front of an edge 8 of the housing. Air and melt can escape to the outside via this hole.

In order to vent and pre-flood the rear portion of the receiving chamber 14 in the screen carrier plunger 10, a venting grove 31 is provided that, starting from a venting hole 31.1, extends in the axial direction on the outer jacket surface to near the venting hole 32. Due to the closeness of the angled end of the venting groove 31 to the venting hole 32, the screen carrier plunger only needs to be moved slightly axially from the position according to FIG. 10a or the position according to FIG. 10c in order to reach a second venting position according to FIG. 10b, where the venting groove 31 reaches a mouth of a venting hole 7 placed in the housing 1.

A melt discharge from the receiving chamber 14 with a significantly reduced volume flow is possible via the venting hole 32, or via the venting hole 31.1, the venting groove 31 and the venting hole 7, respectively. As soon as melt is discharged to atmosphere continuously, venting and pre-flooding is finished and the screen carrier plunger 10 can be returned to the operating position according to FIG. 10a.

There has thus been shown and described a novel filtering device for plastic melts which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A filtering device for plastic melts, comprising at least one screen plunger located in a moveable fashion in a screen plunger borehole between an inlet channel and a discharge channel of a housing, said screen plunger containing replaceable, three-dimensional filter elements, wherein the interior of the filter elements is connected to at least one melt channel formed in the screen plunger and in the production position are connected to the inlet or discharging channel of the housing, wherein the screen plunger exhibits at least one receiving chamber that can be closed by a cover on a face side, and wherein a plurality of filter elements are bundled together with a central distribution element to a filter cartridge that can be placed in the receiving chamber wherein the central distribution element is disc shaped and has opposing circular face sides and the filter elements are bundled on the opposing face sides.

2. A filtering device as set forth in claim 1, wherein a first passage opening of the screen plunger leads via a first melt channel and a first outlet opening in the central distribution element into the receiving chamber and in that from a second passage opening of the screen plunger in the central distribution element, a second melt channel extends to several outlet openings in the central distribution element with a filter element being located in front of each.

3. A filtering device as set forth in claim 2, wherein the filter elements are formed by candle filters.

4. A filtering device as set forth in claim 3, wherein the candle filters extend parallel to the longitudinal axis of the screen plunger and are attached with their open side to openings on the face side of the central distribution element.

5. A filtering device as set forth in claim 1, wherein a first passage opening of the screen plunger leads via at least one first melt channel and at least one first outlet opening in the central distribution element into the receiving chamber and wherein a second melt channel transitions from at least one second passage opening of the screen plunger in the central distribution element to at least one distribution tube with several outlet openings and extends into the receiving chamber, with at least one filter element following the respective distribution tube.

6. A filtering device as set forth in claim 5, wherein the filter elements are formed by candle filters that are each placed on one outlet opening of the central distribution element.

7. A filtering device as set forth in claim 1, wherein the at least one filter cartridge is arranged on both face sides of the central distribution element, and wherein the central distribution element separates the receiving chamber into two chambers.

8. A filtering device as set forth in claim 1, wherein the first passage opening in the screen plunger is connected via a first melt channel to at least one outlet opening that is placed on the face side in the central distribution element.

9. A filtering device as set forth in claim 8, wherein the at least one rod or one tube extends from the central distribution element to the cover.

10. A filtering device as set forth in claim 9, wherein the rod or the tube is arranged on the central axis of the filter cartridge wherein said at least one outlet opening is arranged eccentrically in the central distribution element.

11. A filtering device as set forth in claim 1, wherein protrusions and recesses are formed at the outer circumference of the central distribution element and at the inner circumference of the receiving chamber and engage with each other in a form-fitting manner.

12. A filtering device as set forth in claim 1, wherein a lay-on edge is formed between the outer circumference of the central distribution element and the inner circumference of the receiving chamber.

13. A filtering device as set forth in claim 1, wherein the filter elements extend parallel to the longitudinal axis of the screen plunger and are attached with their open side to openings on the face sides of the central distribution element.

14. A filtering device as set forth in claim 1, wherein the central distribution element is disc shaped and separates the receiving chamber into two separate chambers.

15. A filtering device as set forth in claim 1, wherein the at least one screen plunger is in the form of a tube.

* * * * *